United States Patent [19]

Harbeson

[11] 4,401,850

[45] Aug. 30, 1983

[54] SPEECH ANALYSIS APPARATUS

[75] Inventor: William D. Harbeson, Boonton, N.J.

[73] Assignee: Kay Elemetrics Corp., Pine Brook, N.J.

[21] Appl. No.: 237,320

[22] Filed: Feb. 23, 1981

Related U.S. Application Data

[63] Continuation-in-part of Ser. No. 73,201, Sep. 7, 1979, Pat. No. 4,276,445.

[51] Int. Cl.³ .............................................. G10L 1/00
[52] U.S. Cl. ................................................ 179/1 SC
[58] Field of Search ................ 179/1 SC, 1 SP, 1 D; 324/77; 328/167

[56] References Cited

U.S. PATENT DOCUMENTS

| 3,405,237 | 10/1968 | David et al. | 179/1 SC |
| 4,063,035 | 12/1977 | Appelman et al. | 179/1 SP |
| 4,164,626 | 8/1979 | Fette | 179/1 SC |

*Primary Examiner*—Emanuel S. Kemeny
*Attorney, Agent, or Firm*—Charles E. Baxley

[57] ABSTRACT

Speech analysis apparatus converts sounds to electrical signals which are fed via a selectable low pass filter to extract the fundamental pitch frequency while attenuating the increase in energy with voice pitch and the influence of higher voice pitch harmonic frequencies. The pitch frequency representing signals are fed via a frequency to voltage transducer to a visual display device.

3 Claims, 4 Drawing Figures

SPEECH ANALYSIS APPARATUS

This is a continuation-in-part of U.S. patent application Ser. No. 073,201 filed Sept. 7, 1979, issued as U.S. Pat. No. 4,276,445.

BACKGROUND OF THE INVENTION

This invention pertains to speech analysis apparatus, and more particularly, to apparatus for visually displaying the pitch frequencies in speech sounds.

Speech analysis apparatus has many useful functions. An extremely important function is to train people with hearing and speech disorders in pitch control and inflection, by providing immediate feedback in the form of a visual display. Another use of this apparatus is as an instructional tool in singing where a measure of the singer's pitch frequency and rate and amplitude of the vibratos (and tremolos) are extremely important. A further use for such apparatus is as an aid in the detection of pathologies which affect the vocal cords thereby causing various degrees of pitch perturbations which can be best measured by a visual real time display.

It is accordingly an object of the invention to provide a fast and accurate apparatus for measuring, and displaying in real time, dynamic pitch frequencies on a cycle-to-cycle basis.

It is another object of the invention to provide simple display of the dynamic pitch frequency so that the apparatus may be used as a bio-feedback device in the training of pitch control for education, singing, and for the hard of hearing and profoundly deaf.

A still further object of the invention is to provide an aid in the detection of various pathologies in which an early symptom would be a deviation or perturbation of the pitch frequencies from the normal range and limits.

SUMMARY

A voiced sound is one produced by vibrations of the vocal cords—in the larynx during an articulation. The vocal cord vibrations are such that a pure tone (or frequency) is not produced. What is produced is a complex waveform (glottal pulses), wherein the pitch frequency is the fundamental frequency. The complex waveform is modified in the vocal track (air passages). The vocal track shapes the glottal pulses such that certain bands of the harmonic frequencies are attenuated and other bands are accentuated. The degree and position of the shaping depends on many combinatorial conditions. The result of this operation is voiced speech. Because of the shaping of the glottal pulses it has heretofore been difficult to determine quickly and accurately a person's fundamental speech frequency either with sustained vowels or in dynamic speech. The invention contemplates providing an accurate representation of the pitch frequency.

In particular, the invention contemplates a speech analysis apparatus which has a transducer means for converting speech sounds into electrical signals. The electrical signals are fed to a low pass filter and other limiting circuit means for extracting the pitch frequency from the electrical signals representing the speech sounds. In this respect, it has been found that the energy in the fundamental voice frequency, as a normal speaker's voice pitch is increased, also increases at a rate of about 13 db to 15 db per octave. The filters that characterize this invention attenuate the increase at this same rate in order to produce a relatively "flat" response. In this manner, second and higher voice harmonic frequencies are significantly attenuated and the filters produce an output signal that generally reflects the fundamental voice pitch frequency. The output of the low pass filter and other limiting circuit means is connected to a frequency-to-voltage generator means for generating a voltage whose amplitude is a function of the pitch frequency. Finally, the voltage amplitude signals are fed to means for storing and visually displaying these signals.

BRIEF DESCRIPTION OF THE DRAWING

Other objects, the features and advantages of the invention will be apparent from the following detailed description read with the accompanying drawing. In the drawing.

DETAILED DESCRIPTION OF THE PREFERRED EMBODIMENT

Figure 1:
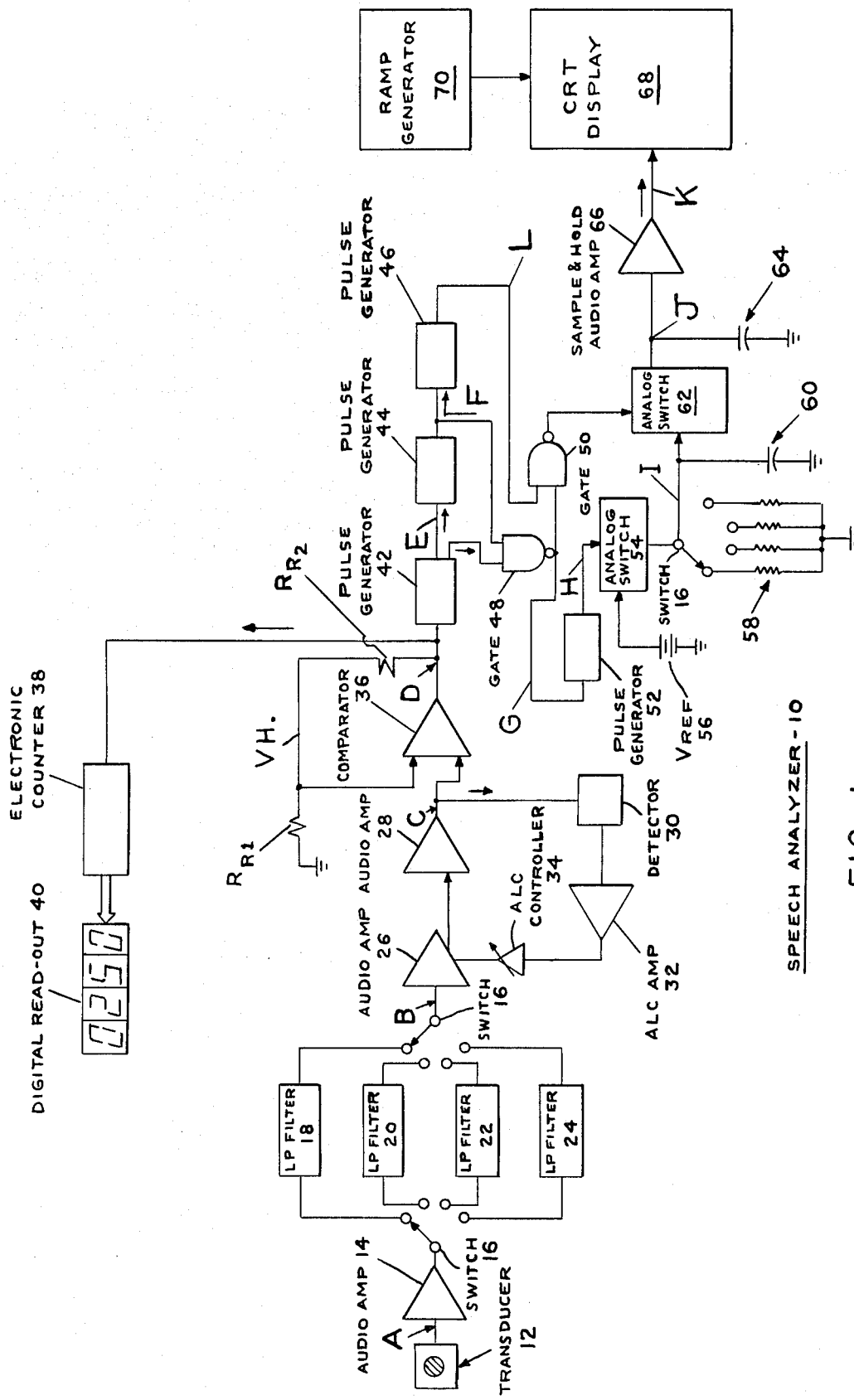
FIG. 1 is a block diagram of a speech analyzer according to the presently preferred embodiment of the invention.
Figure 2:
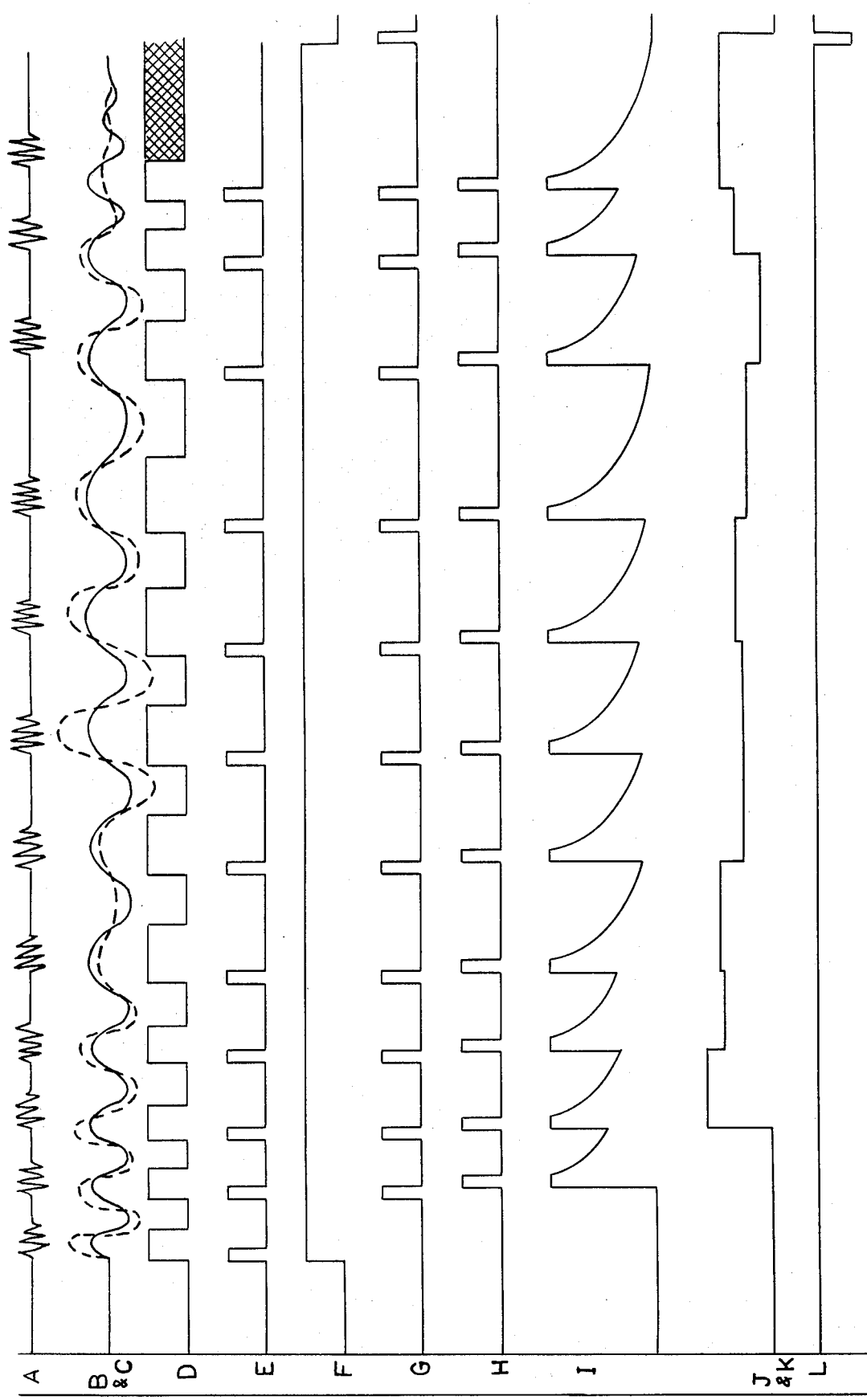
FIG. 2 is a wave-form diagram useful in explaining the operation of the apparatus of FIG. 1.

The speech sound to be analyzed is introduced into the transducer 12, which generates an electrical signal fed via audio-amplifier 14 to the movable contact of the first bank of switch 16. The electrical signal produced by the transducer 12, which can be a microphone or another recording, is normally a series of complex electrical signal waves transduced from the voiced sounds. These signals vary in frequency and amplitude and contain energies which are at the fundamental pitch frequency and at harmonics of the fundamental pitch frequency. A typical representation of the electrical signals at this point is shown in waveform A of FIG. 2. The movable contact of a first bank of switch 16 is selectively connectable to the inputs of selected low-pass filters of a set via associated fixed contacts. For instance, the low-pass filter 18 with approximately a 100 Hz 3 db point would be used for analyzing the speech sounds of an adult male. The low-pass filter 20 with a 3 db point of about 200 Hz would be used for an adult female, while for children the low-pass filter 22 with a 3 db point of 400 Hz would be used. Finally, the low-pass filter 24 with a 3 db point of 800 HZ is used in those cases where the measurement of the maximum fundamental pitch frequency of women and children is desired. The output of each of these filters is connected to a corresponding fixed contact of the second bank of switch 16. Therefore, when switch 16 is fixed to a particular position, say the adult males, the output of the audio-amplifier 14 is connected via the low-pass filter 18 to the input of the audio-amplifier 26 connected to the movable contact of the second bank of the switch 16. The waveform B (dotted line) of FIG. 2 shows the electrical signal after filtering. As indicated in waveform B, most of the harmonic or overtone energy has been removed. The energy retained is mainly the fundamental pitch frequency of the voiced sounds received by the transducer.

Figure 3:
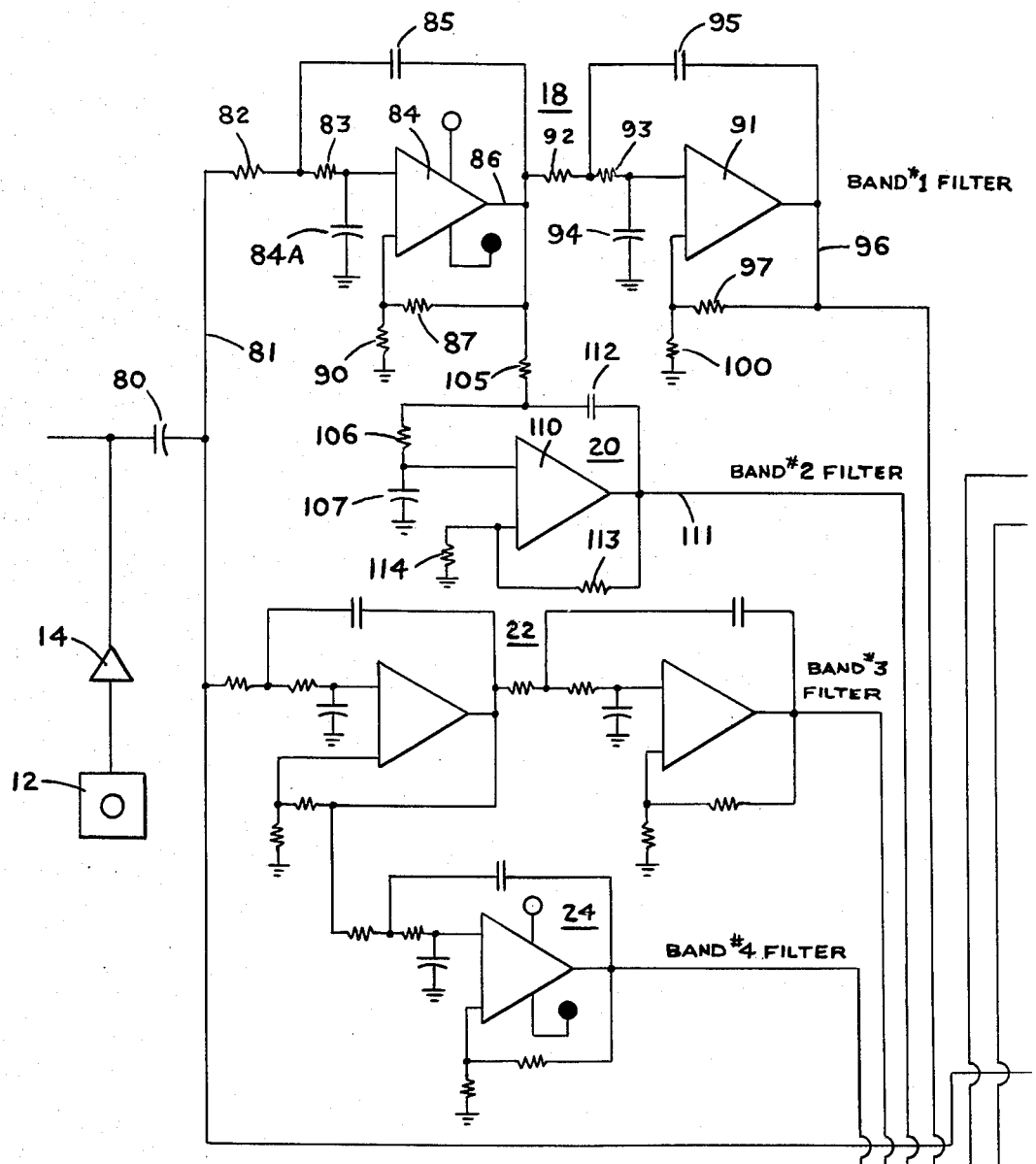
FIG. 3 is a schematic diagram of filters for use in connection with the circuit shown in FIG. 1.

As illustrated in FIG. 3, a typical array of filters for removing overtone or harmonic frequencies receive its input signal from the series-coupled sound transducer 12 and audio-amplifier 14 by way of a capacitor 80. Signals passing through the capacitor are sent through a conductor 81 and a resistor 82 to the low frequency passing filter 18. The filter 18 has a resistor 83 coupled to ground through a capacitor 84 A to suppress undesired input frequencies. The resistor 83, moreover, is coupled to an input terminal of an amplifier 84. As shown in the drawing, a capacitor 85 is coupled between amplifier output conductor 86 and the input to the resistor 83. The amplifier 84 also has a second input terminal which is connected to the output conductor 86 through a feedback resistor 87 and to ground through a resistor 90.

The output conductor 86 also is coupled to an input terminal of an amplifier 91 through series connected resistors 92, 93. Typically, the resistor 93 with a capacitor 94 coupled to ground provides a further "wave trap" for undesired signal frequencies. Further feedback for the amplifier 91 is shown by means of a capacitor 95, which connects output conductor 96 to the input to the resistor 93, and resistor 97 which is coupled between the output conductor 96 and another input terminal for the amplifier 91. The resistor 97 also is connected to ground through resistor 100.

The illustration in FIG. 3 shows the output conductor 96 connected to a stationery contact in the first bank of the switch 16.

Figure 4:
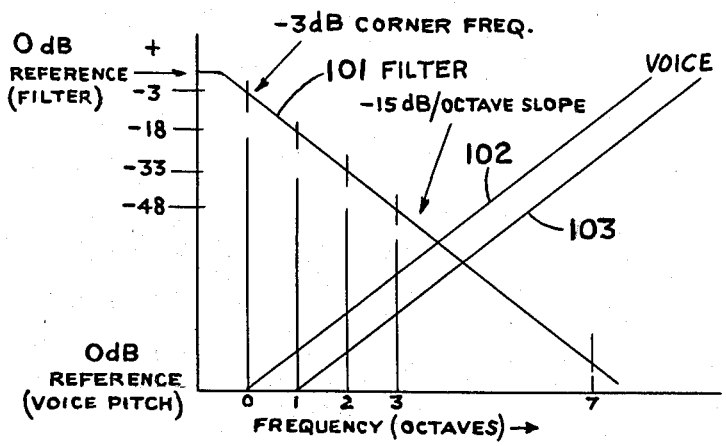
FIG. 4 is a graph showing the characteristic of the filters shown in FIG. 3 as well as the increase in fundamental pitch and second harmonic frequencies.

Attention now is invited to FIG. 4. It will be recalled that as the male voice pitch is increased, the energy of the fundamental pitch frequency also increases at a rate of about 13 db to 15 db per octave. In order to eliminate second and higher harmonic frequencies from the signal that is being processed, and in accordance with the invention, the frequency attenuation slope of the filter characteristic curve 101 is flat for frequencies up to 100 Hz at 3 db for the low passing filter 18. Note, in this respect that there is an approximate 15 db difference between the fundamental male voice pitch frequency curve 102 and a generally parallel second harmonic male voice pitch frequency curve 103. Both of the curves 102 and 103 moreover, have slopes that are equal in magnitude and opposite in direction to the slope of the characteristic curve 101 for the filter 18.

Consequently, the characteristic of the low pass filter 18 (FIG. 3) effectively subtracts the energy increase from the fundamental pitch frequency as well as the second (and higher) harmonic signal in order to generate a filter output signal that is flat over the entire range of voice octaves.

Turning once more to FIG. 3, the low pass filter 20 is used for the voice of an adult female. As shown in the drawing, an amplifier 110 is coupled to the output conductor 86 of the amplifier 84 through a resistor 105 and a resistor 106. The resistor 106 and a capacitor 107, moreover, combine to form a "wave trap". This "wave trap" is connected to an input terminal of the amplifier 110. Output conductor 111 also is coupled in feedback to the resistor 106 and the associated amplifier input terminal by way of a capacitor 112. A further feedback network, between the output conductor 111 and another amplifier input terminal, is provided by means of voltage divider resistors 113, 114. To complete the circuit, as shown, the output conductor 111 for the low-pass filter 20 is connected to another of the mobile terminals of the first bank in the switch 16.

As previously mentioned, the filter 20, to accommodate the voice of the adult female, is flat from zero to the 3 db point at about 200 Hz. At this point, the characteristic for the filter 20 slopes downwardly at a rate of about −15 db per octave. This characteristic slope moreover provides the voice energy increase compensation and higher harmonics subtraction features that enable the output signal from the filter 20 to be essentially flat over the entire female voice range.

In a similar manner, the low pass filters 22 and 24 provide relatively flat fundamental pitch frequency output signals, respectively, for children and for women and children in which, in the latter case, a maximum fundamental pitch frequency is desired. There remains, however, some second and third harmonics and the amplitude of the waveform is not uniform. Consequently, the filtered signal is subjected to an automatic level control processing.

In particular, the output of the audio-amplifier 26, which is a negative feedback amplifier, is fed to audio-amplifier 28. From there the signal is peak detected by detector 30 and fed via automatic level control amplifier 32 to the input of the automatic level controller 34, whose output generates a negative feedback signal, controlling the level of the signal passed by audio-amplifier 26. As can be seen in waveform C (solid line) of FIG. 2, the pitch frequency information is retained except that the intensity of level has been controlled for a constant peak-to-peak value. It should be noted that the automatic control time constant, that is, the time the automatic level control circuit takes to correct a level change is approximately 50 msec. This time constant is chosen to allow for the lowest male pitch of approximately 60 to 70 Hz and yet retain "fast" ALC response.

Further filtering is performed by the comparator 36, having a signal input connected to the output of audio-amplifier 28 and a reference input connected through a resistive divider network RR to the comparator output. The comparator is designed such that all vestigal harmonic energy of the fundamental pitch frequency is removed by yielding a square wave whose frequency is the original fundamental pitch frequency. The comparator 36 is actually a bi-level signal voltage sensor which generates a signal of a first level as long as the input signal is above a given voltage value and generates a signal of a second level when the input signal is below a second given voltage value. The output of the comparator 36 is shown as waveform D of FIG. 2.

The output of the comparator 36 is fed to the pulse generator 42 which is actually a "one shot" multi-vibrator. In particular, the multi-vibrator emits a pulse of a given duration in response to the positive going leading edge of an input signal. The duration of the pulse is controlled in the present embodiment to be 50 usec and is shown as waveform E in FIG. 2. The pulse generator 42 has two outputs, one connected to the input of pulse generator 44 and the second to the gate 48. Pulse generator 44 is a retriggerable one-shot multi-vibrator having outputs fed to the input of pulse generator 46 and to the second input of the gate 48. Pulse generator 42 and pulse generator 44 cooperate at the gate 48 to insure that the first pulse in the series being analyzed does not pass to the subsequent processing circuitry. This wait or delay of one pitch frequency pulse is to ensure that the apparatus does not respond to plosive sound generated by the speaker when such undetected consonants as "p" and "t" are articulated. These consonants tend to be single wave from phenomena.

When the second fundamental pitch pulse or cycle appears at the output of comparator 36, another pulse is produced by pulse generator 42. This second and all subsequent pulses for the voiced sound period are coupled through gate 48 to the input of gate 50 and pulse generator 52. The gate 50 acting as a OR-circuit passes the pulse to the control input of analog switch 62. These pulses are shown as waveform G. At the same time, the trailing edges of the pulses from gate 48 trigger the pulse generator 52 which acts as a monostable multivibrator and emits one pulse for each trailing edge sensed. The output of pulse generator 52 is shown as waveform H.

It is worthwhile to compare the waveforms G and H. It will be noted that first a pulse is generated waveform G, followed by a pulse as waveform H. Thus, each pulse emitted by gate 48 causes the generation of a pair of pulses, one following the other, wherein the leading edge of the second pulse is at the trailing edge of the first pulse. The pulses at the output of pulse generator 52 control the operation of the analog switch 54 just as the pulses at the output of gate 50, control the operation of the analog switch 62.

In general, when a pulse is present at the output of pulse generator 52, the reference voltage 56 is connected to the movable contact of the third bank of switch 16 which is connected to the charging capacitor 60 and to one of the discharge resistors 58. Each of these resistors R1 to R4 is, respectively, associated with one of the low-pass filters 18 to 24, respectively. At the end of a pulse from pulse generator 52, the analog switch 54 opens, removing the reference voltage. Thereafter, until the next pulse the capacitor 60 discharges through one of the discharge resistors, for example, resistor R1.

It should be noted, as seen from the waveforms I and G of FIG. 2, that the greater the separation between adjacent pulses in waveform G, the longer the capacitor discharges. Thus, the final level of the charge of the capacitor is an indication of the spacing between adjacent pulses, which in turn is a function of the frequency of the pulses. Therefore, this combination can be considered a frequency to voltage amplitude converter. During the occurrence of each pulse from gate 50 (waveform G) the analog switch 62 is momentarily closed connecting capacitor 60 to the holding capacitor 64 and the voltage level across capacitor 60 is transferred to across capacitor 64. At the end of the pulse the charge remains on capacitor 64, since there are no discharging paths for the capacitor. Consequently, that voltage is held until the next time the switch 62 is closed. The held voltage level is a measure of the frequency for that particular cycle and is shown as waveforms J and K. This held voltage is fed via the sample and hold audio amplifier 66 to the vertical input of the cathode ray tube display 68, whose horizontal input at that time is receiving a ramp voltage from ramp generator 70 to provide the horizontal sweep. In this way, the pitch frequency is instantaneously displayed and since this pitch frequency varies in time, the actual waveform on the display will be generally a varying waveform.

It should be noted that at the end of the operation pulse generator 46 emits a pulse (waveform L) in response to the trailing edge of the waveform F. This pulse then activates analog switch 62 for the last time to pass the voltage across the capacitor 64 for the final time to the audio amplifier 66. (This pulse at the output of pulse generator 46 occurs about 25 msec. after the last operation of the analog switch 54. Therefore, the voltage across the capacitor 60 is effectively at zero volts and this displayed indicating the end of the measuring cycle.)

It should also be noted at the same time that the output of the comparator 36 is fed to an electronic pulse counter 38, whose output is fed to a conventional digital readout 40, so that the pitch frequency can also be displayed as a digital number.

APPENDIX

Since most of the elements of the speech analyzer 10 are conventional devices, only those unusual circuits will be further described. For example, the audioamplifier 26 is a conventional operational amplifier, operating in the negative feedback mode.

The comparator 36 is a high gain operational amplifier having a direct input connected to the output of audio amplifier 28 and a second input connected to the resistive divider voltage, hereinafter called the hysteresis voltage VH. By setting the voltage VH from the zero value the comparator does not work as a conventional zero-crossing detector, but switches at slightly different values in each direction. This hysterisis eliminates the second harmonic provided that the input signal to the comparator has a consistently high amplitude. Thus, the automatic level control device is used to provide a constant peak to peak amplitude level.

In the electronic counter 38 there is included an array of counters which count at twice the rate of the received pulse, thus reducing the count time from 2 seconds to 1 second. This can be accomplished by feeding each pulse to a dual one-shot multivibrator, so that both the leading and trailing edges of the input pulses drive the counter. The counter can be fed to a digit divider decoder which, in turn, feeds conventional LED display devices such as type 4610A. The pitch energy comparsation and higher harmonics substration features of the filters 18, 20, 22, 24 produce a generally flat fundamental pitch frequency output signal that also adds a significant contribution to the overall accuracy of the apparatus.

While only one embodiment of the invention was shown and described in detail, it should now be obvious to those skilled in the art, many modifications and variations satisfying may or all of the objects of the invention, but not departing from the spirit thereof, are defined by the appended claims.

I claim:

1. Speech analysis apparatus comprising, transducer means for converting speech sounds into electrical signals, low pass filter means connected to said transducer means for extracting on a real time, cycle-to-cycle basis the fundamental pitch frequency from the electrical signals representing the speech sounds, said filter means having a signal attentuation characteristic that is flat for low frequencies up to a selected frequency level and effects an increasing reduction of signal level with pitch frequencies above said selected level of between 13 decibels per octave and 15 decibels per octave in order to compensate for the increase in signal energy with speech pitch and to subtract second and higher voice frequency harmonics from said electrical signals, frequency-to-voltage generator means responsive to said low pass filter means for generating a voltage whose amplitude is a function of the fundamental pitch frequency extracted from said electrical signal, and means for displaying on a real time, cycle-to-cycle basis the output of said frequency-to-voltage generating means.

2. The apparatus of claim 1 wherein said filter means comprises, a pair of series connected amplifiers, capacitive feedback networks for each of said respective amplifiers, one of said capacitive networks being coupled to an input terminal of the respective amplifier in order to filter a frequency band of said signals.

3. The apparatus of claim 2 wherein said filter means further comprises a third amplifier, a capacitive feedback network for said third amplifier, said capacitive network being coupled to an input terminal of said third amplifier with the output from said respective amplifier to which said electrical signals are applied in order to filter another frequency band of said signals.

* * * * *